(12) United States Patent
Joseph

(10) Patent No.: US 9,132,363 B2
(45) Date of Patent: Sep. 15, 2015

(54) EXTRACTION SYSTEM

(71) Applicant: Andrew Paul Joseph, Johnstown, OH (US)

(72) Inventor: Andrew Paul Joseph, Johnstown, OH (US)

(73) Assignee: APEKS LLC, Johnstown, OH (US)

( * ) Notice: Subject to any disclaimer, the term of this patent is extended or adjusted under 35 U.S.C. 154(b) by 0 days.

(21) Appl. No.: 14/085,682

(22) Filed: Nov. 20, 2013

(65) Prior Publication Data
US 2015/0139865 A1    May 21, 2015

Related U.S. Application Data

(60) Provisional application No. 61/728,656, filed on Nov. 20, 2012, provisional application No. 61/799,665, filed on Mar. 15, 2013.

(51) Int. Cl.
| | | |
|---|---|---|
| *B01D 11/04* | (2006.01) | |
| *B01D 11/02* | (2006.01) | |

(Continued)

(52) U.S. Cl.
CPC .......... *B01D 11/0407* (2013.01); *B01D 11/028* (2013.01); *B01D 11/0288* (2013.01); *B01D 11/0403* (2013.01); *B01D 11/0484* (2013.01); *B01D 11/0488* (2013.01); *B01D 11/0492* (2013.01); *C11B 1/104* (2013.01); *C11B 7/005* (2013.01); *B01D 2011/007* (2013.01)

(58) Field of Classification Search
CPC .......... B01D 11/0484; B01D 11/0488; B01D 11/0492; B01D 11/028; B01D 11/0284; B01D 11/0288; B01D 11/0403; B01D 11/0407; B01D 2011/007; B01D 29/66; B01D 29/0079; B01D 35/12; C11B 1/10; C11B 1/102; C11B 1/104; C11B 1/108; C11B 3/006; C11B 7/005; C11B 7/0008
USPC ......... 210/149, 175, 182, 259, 511, 634, 639, 210/806, 257.1, 257.2, 333.01, 333.1, 411, 210/798; 422/256, 260; 554/8, 11, 16
See application file for complete search history.

(56) References Cited

U.S. PATENT DOCUMENTS

| | | | |
|---|---|---|---|
| 3,577,341 A * | 5/1971 | Keith et al. | ................... 210/712 |
| 3,918,859 A | 11/1975 | Dugan et al. | |

(Continued)

FOREIGN PATENT DOCUMENTS

| | | |
|---|---|---|
| CN | 2393612 Y | 8/2000 |
| CN | 1284396 A | 2/2001 |

(Continued)

OTHER PUBLICATIONS

International Search Report and Written Opinion of the International Searching Authority / U.S.

*Primary Examiner* — Joseph Drodge
(74) *Attorney, Agent, or Firm* — Bricker & Eckler LLP

(57) ABSTRACT

An extraction apparatus comprises an extraction vessel configured to remove an extracted material from a source material in contact with a process fluid to form a mixture. The apparatus further comprises a separation chamber and a process fluid circulation conduit, the conduit comprising a separation portion configured to receive the mixture and permit a portion of the extracted material to separate from the mixture within the separation chamber. The apparatus further comprises a temperature regulator configured to permit re-circulation of a temperature regulation fluid and regulate the temperature of the process fluid.

45 Claims, 8 Drawing Sheets

(51) Int. Cl.
*C11B 1/10* (2006.01)
*C11B 7/00* (2006.01)
*B01D 11/00* (2006.01)

(56) References Cited

U.S. PATENT DOCUMENTS

| | | | |
|---|---|---|---|
| 4,548,755 A * | 10/1985 | Stahl et al. | 554/8 |
| 4,675,133 A | 6/1987 | Eggers et al. | |
| 4,898,673 A | 2/1990 | Rice et al. | |
| 4,962,275 A | 10/1990 | Bruno | |
| 5,252,729 A | 10/1993 | De Crosta | |
| 5,267,455 A | 12/1993 | Dewees et al. | |
| 5,340,475 A * | 8/1994 | Cortes et al. | 210/198.2 |
| 5,472,612 A | 12/1995 | Maxwell | |
| 5,750,027 A | 5/1998 | Allington et al. | |
| 5,795,594 A | 8/1998 | York | |
| 6,326,504 B1 | 12/2001 | Piquer et al. | |
| 6,799,587 B2 | 10/2004 | Marshall et al. | |
| 7,259,231 B2 | 8/2007 | Cornish et al. | |
| 7,335,296 B2 | 2/2008 | Arai et al. | |
| 8,119,419 B2 | 2/2012 | Stroup | |
| 8,778,181 B1 * | 7/2014 | Johnson et al. | 210/260 |
| 2004/0107901 A1 | 6/2004 | Del Re | |
| 2006/0035350 A1 * | 2/2006 | Catchpole et al. | 435/134 |
| 2006/0153757 A1 | 7/2006 | Cooper | |
| 2009/0026136 A1 * | 1/2009 | Beltz et al. | 210/634 |
| 2010/0144670 A1 * | 6/2010 | Foster et al. | 514/58 |
| 2010/0151098 A1 * | 6/2010 | Catchpole et al. | 426/425 |
| 2011/0034712 A1 * | 2/2011 | Lin | 554/22 |

FOREIGN PATENT DOCUMENTS

| | | |
|---|---|---|
| CN | 1548206 A | 11/2004 |
| CN | 1919232 A | 2/2007 |
| CN | 202128943 U | 2/2012 |

* cited by examiner

EXTRACTION SYSTEM

CROSS-REFERENCE TO RELATED APPLICATION

This application claims priority to and claims the benefit of U.S. Provisional Patent Application Ser. No. 61/728,656 filed Nov. 20, 2012, which is incorporated by reference in its entirety as if fully set forth herein. This application claims priority to and claims the benefit of U.S. Provisional Patent Application Ser. No. 61/799,665 filed Mar. 15, 2013, which is incorporated by reference in its entirety as if fully set forth herein.

FIELD

The disclosed systems and methods relate generally to the field of fluid extraction.

SUMMARY

Figure 1:
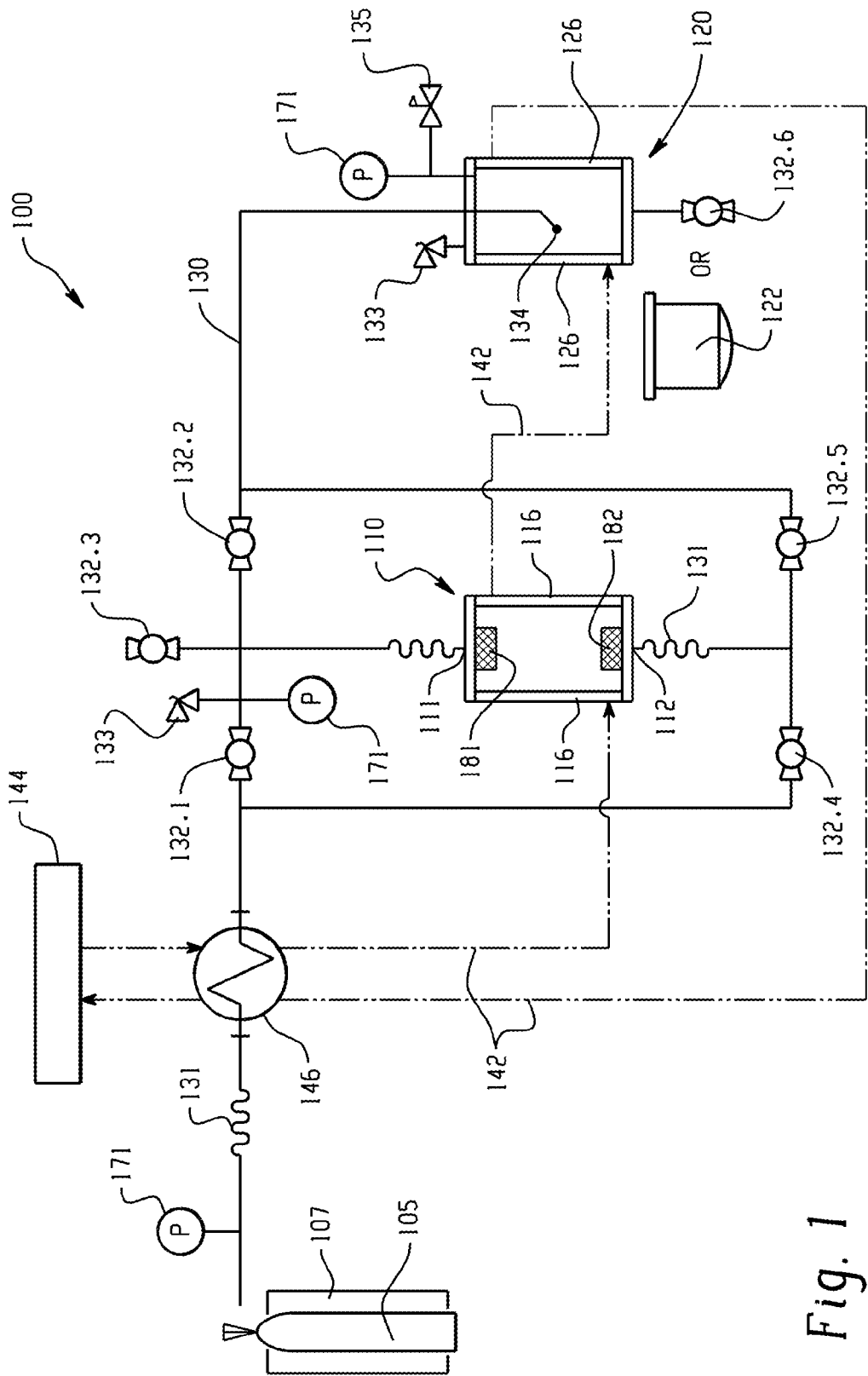
FIG. 1 is a schematic diagram of an extraction system.

An extraction apparatus can include an extraction vessel configured to receive a process fluid, permit the process fluid to come into contact with a source material within the extraction vessel, permit an extracted material to be removed from the source material, and permit the extracted material and the process fluid to form a mixture. The extraction vessel can include an extraction vessel filter adapted to retain portions of the source material while also allowing the mixture to pass.

The extraction apparatus can include a separation chamber.

The extraction apparatus can include a process fluid circulation conduit configured to selectively restrict, allow, and reversibly direct flow of the process fluid into and out of the extraction vessel and permit the mixture to flow from the extraction vessel to the separation chamber. The process fluid circulation conduit can include a separation portion configured to receive the mixture and permit a portion of the extracted material to separate from the mixture within the separation chamber.

The extraction apparatus can include a temperature regulator. The temperature regulator can include a temperature regulation fluid and a temperature regulation fluid circulation line. The temperature regulator can be configured to permit re-circulation of the temperature regulation fluid and regulate the temperature of the process fluid.

The extraction apparatus can include a back pressure regulator configured to maintain pressure within the separation chamber and vent the process fluid.

In some examples, the extraction apparatus can include a heating source configured to heat the process fluid prior to ingress of the process fluid into the extraction vessel.

In some examples, the extraction apparatus can include a heat exchanger configured to regulate temperature of the process fluid prior to ingress of the process fluid into the extraction vessel.

In some examples, the extraction apparatus can include an extraction vessel temperature regulator. In some examples, the extraction apparatus can include a separation chamber temperature regulator.

In some examples, of the extraction apparatus, the process fluid used can be carbon dioxide. In some examples, of the extraction apparatus, the process fluid can be supercritical carbon dioxide. In some examples, of the extraction apparatus, the source material can be a botanical substance. In some examples, of the extraction apparatus, the extracted material can include at least one of a botanical oil and a wax.

In some examples, of the extraction apparatus, the process fluid circulation conduit can include valves configured to selectively restrict, allow, and reversibly direct flow of the process fluid through the process fluid circulation conduit.

In some examples, of the extraction apparatus, the extraction vessel can include a first extraction vessel filter and a second extraction vessel filter. In some examples, the extraction apparatus can be configured to permit reversal of a direction of flow of the process fluid through the first extraction vessel filter and the second extraction vessel filter.

In some examples, of the extraction apparatus, the separation portion can include an orifice. In some examples, of the extraction apparatus, the separation portion can be orientated to direct the process fluid along an inner wall of the separation chamber in a generally rotational manner. In some examples, of the extraction apparatus, the orifice can be sized to match a flow rate of the process fluid.

A re-circulating extraction apparatus can include an extraction vessel configured to receive a process fluid, permit the process fluid to come into contact with a source material within the extraction vessel, permit an extracted material to be removed from the source material, and permit the extracted material and the process fluid to form a mixture. The extraction vessel can include a filter adapted to retain portions of the source material while also allowing the mixture to pass.

The re-circulating extraction apparatus can include a separation chamber. The re-circulating extraction apparatus can include an overflow chamber.

The re-circulating extraction apparatus can include a process fluid circulation conduit configured to selectively restrict, allow, and reversibly direct flow of the process fluid into and out of the extraction vessel, permit the mixture to flow from the extraction vessel to the separation chamber, permit the process fluid to flow from the separation vessel to the overflow chamber, and permit re-circulation of the process fluid. The process fluid circulation conduit can include a separation portion configured to receive the mixture and permit a portion of the extracted material to separate from the mixture within the separation chamber.

The re-circulating extraction apparatus can include a temperature regulator. The temperature regulator can include a temperature regulation fluid and a temperature regulation fluid circulation line. The temperature regulator can be configured to permit re-circulation of the temperature regulation fluid and regulate the temperature of the process fluid.

The re-circulating extraction apparatus can include a pump configured to increase or maintain the pressure of the process fluid.

In some examples, the re-circulating extraction apparatus can include a heating source configured to heat the process fluid prior to ingress of the process fluid into the extraction vessel.

In some examples, the re-circulating extraction apparatus can include a heat exchanger configured to regulate temperature of the process fluid prior to ingress of the process fluid into the extraction vessel.

In some examples, the re-circulating extraction apparatus can include a regenerative heat exchanger.

In some examples, the re-circulating extraction apparatus can include an extraction vessel temperature regulator. In some examples, the re-circulating extraction apparatus can include a separation chamber temperature regulator. In some examples, the re-circulating extraction apparatus can include an overflow chamber temperature regulator.

In some examples, of the re-circulating extraction apparatus, the process fluid can include carbon dioxide. In some examples, of the re-circulating extraction apparatus, the process fluid can include supercritical carbon dioxide. In some examples, of the re-circulating extraction apparatus, the source material can include a botanical substance. In some examples, of the re-circulating extraction apparatus, the extracted material can include at least one of a botanical oil and a wax.

In some examples, of the re-circulating extraction apparatus, the process fluid circulation conduit can include valves configured to selectively restrict, allow, and reversibly direct flow of the process fluid through the process fluid circulation conduit.

In some examples, of the re-circulating extraction apparatus, the extraction vessel can include a first extraction vessel filter and a second extraction vessel filter. In some examples, the re-circulating extraction apparatus can be configured to permit reversal of a direction of flow of the process fluid through the first extraction vessel filter and the second extraction vessel filter.

In some examples, of the re-circulating extraction apparatus, the separation portion can include an orifice. In some examples, of the re-circulating extraction apparatus, the separation portion can be orientated to direct the process fluid along an inner wall of the separation chamber in a generally rotational manner. In some examples, of the re-circulating extraction apparatus, the orifice can be sized to match a flow rate of the process fluid.

DETAILED DESCRIPTION

Several examples, of systems configured to perform extraction are disclosed. In each example, the systems can be configured to permit a process fluid to be in contact with a source material, whereby an extracted material is removed from the source material, forming a mixture with the process fluid.

In some examples, the process fluid can be carbon dioxide. In some examples, the process fluid can be supercritical carbon dioxide. The process fluid can any other fluid suitable for forming a mixture when placed in contact with the source material. Optionally, certain additives can be included in the process fluid, for example, ethanol.

In some examples, the source material can be a botanical substance. In some examples, the extracted material can include at least one of a botanical oil and a wax. In other examples, the source material can be any material in which extraction is desired. For example, the source material could be any physical article such as an instrument, tool, medical device, or implant. By operation of the disclosed systems, manufacturing fluids or other forms of residue can be removed from the surface of the physical article.

As shown in FIG. 1, an extraction apparatus 100 can include an extraction vessel 110 configured to receive a process fluid, permit the process fluid to come into contact with a source material within the extraction vessel 110, permit an extracted material to be removed from the source material, and permit the extracted material and the process fluid to form a mixture.

In some examples, the extraction vessel 110 can be about 1 liter and can be rated to a maximum pressure of about 1500 pounds per square inch (psi) at about 200 degrees Freiheit (° F.). In some examples, the extraction vessel 110 can have an opening for receiving the process fluid. In some examples, the extraction vessel can have multiple openings for receiving the process fluid. In the example shown in FIG. 1, the extraction vessel 110 includes a first extraction vessel opening 111 and a second extraction vessel opening 112. In some examples, the openings of the extraction vessel can be sealed using an elastomeric O-ring. One example of a suitable elastomeric O-ring is a Buna-90 O-ring.

The extraction vessel 110 can include an extraction vessel filter adapted to retain portions of the source material while also allowing the mixture to pass. In some examples, the extraction vessel 110 can have a multiple filters. As shown in FIG. 1, the extraction vessel 110 can include a first extraction vessel filter 181 located near the first extraction vessel opening 111 and a second extraction vessel filter 182 located near the second extraction vessel opening 112.

The extraction apparatus 100 can include a separation chamber 120. In some examples, the separation chamber can be rated for about 500 psi at 200° F.

The extraction apparatus 100 can include a process fluid circulation conduit 130 configured to selectively restrict, allow, and reversibly direct flow of the process fluid into and out of the extraction vessel 110 and permit the mixture to flow from the extraction vessel 110 to the separation chamber 120. The process fluid circulation conduit 130 can be stainless steel in some examples. In other examples, the process fluid circulation conduit 130 can be made from one of a family of austenitic nickel-chromium based alloys, such as those supplied commercially under the brand name Inconel® by Special Metals Corporation. In other examples, the process fluid circulation conduit 130 can be made from other suitable material for high corrosion resistance. In other examples, the process fluid circulation conduit 130 can be steel or another suitable material for applications with low sanitary requirements. In some examples, the process fluid circulation conduit 130 can be sized about 304 stainless steel (SS) with about ⅜ inches diameter, and a wall thickness of about 0.035 inches. The process fluid circulation conduit 130 can include flexible portions 131.

The process fluid circulation conduit 130 can include one or more valves configured to selectively restrict, allow, and reverse a direction of flow of the process fluid through the process fluid circulation conduit 130 and other portions of the extraction apparatus 100. In some examples, the valves can be rated from about −22° F. to about 356° F.

In some examples, the process fluid circulation conduit 130 can be configured with a system of valves to selectively direct an amount of the process fluid to remain within the extraction vessel 110 for a desired time, for example, to allow the extraction process to be completed to a desired extent. In some examples, the extraction apparatus 100 can be configured with a system of valves to permit reversal of a direction of flow of the process fluid through the extraction vessel 110. In some examples, the reversal of the direction of flow of the process fluid through the extraction vessel 110 can facilitate cleaning or clearing of the first and second extraction vessel filters 181 and 182 without interrupting ongoing extraction processing.

In some examples, the system of valves can include one or more pairs of opposing valves for directing the flow of process fluid. In the example of FIG. 1, the first, second, third, fourth, and fifth valves, labeled 132.1, 132.2, 132.3, 132.4, and 132.5 respectively, can be positioned along the process fluid circulation conduit 130 as shown. To direct process fluid into the extraction vessel 110 at a first extraction vessel opening 111, the first valve 132.1 can be opened while the second valve 132.2 can be closed. To direct the process fluid out of the extraction vessel 110 and further downstream in the system, the second valve 132.2 can be opened while the first vale 131.1 can be closed. The third valve, 132.3, can be used to decompress the system and vent process fluid out of the system.

In the example of FIG. 1, the fourth and fifth valves, 132.4 and 132.5, can be configured to direct the process fluid into or out of a second extraction vessel opening 113. Optionally, the valves could be used to direct the process fluid into or out of multiple openings of the extraction vessel 110. For example, by opening the first valve 132.1 and fifth valve 132.5 while closing the downstream second valve 132.2 and fourth valve 132.4, the process fluid can be directed into the first extraction vessel opening 111 and out of the second extraction vessel opening 112. By closing the first valve 132.1 and fifth valve 132.5 while opening the second valve 132.2 and fourth valve 132.4, the process fluid can be directed into the second extraction vessel opening 112 and out of the first extraction vessel opening 111.

In the example apparatus depicted in FIG. 1, the process fluid can be directed in a first direction of flow such that the process fluid enters the extraction vessel 110 through extraction vessel opening 111, passing through the extraction vessel filter 181. According to this direction of flow, the process fluid can pass through an interior portion of the extraction vessel 110 where it can come into contact with the source material, extract the extracted material, and form the mixture. The mixture can then be directed to pass through filter 182 and exit the extraction vessel 110 at opening 112. Optionally, the valves can be re-configured such that the direction of flow of the process fluid and/or mixture can be reversed, allowing the process fluid and/or mixture to enter the extraction vessel 110 at extraction vessel opening 112, pass through the extraction vessel filter 182, pass through filter 181, and exit at extraction vessel opening 111.

The process fluid circulation conduit 130 can include a separation portion 134 configured to receive the mixture and permit a portion of the extracted material to separate from the mixture within the separation chamber 120. In some examples, the separation portion 134 can allow the process fluid to decompress in the separation chamber 120 and separate the extracted material from the process fluid without the use of a valve or regulator for separation.

In some examples, the separation portion 134 can include an orifice. The orifice can be sized to match a flow rate of the process fluid. In some examples, the orifice can be about 0.010 inches in diameter. In some examples, the orifice can restrict the flow of process fluid, allowing a significant pressure drop in the mixture after passing through the orifice and allowing the process fluid to change from a subcritical or supercritical state to a gaseous state, thereby allowing the extracted material to fall out, or separate, from the process fluid.

In some examples, the separation portion 134 can be positioned near an inner wall of the separation chamber 120. In some examples, the separation portion 134 can be orientated to direct the process fluid along the inner wall of the separation chamber 120 in a generally rotational manner. In some examples, a portion of process fluid circulation conduit 130 leading to the separation portion 134 can be angled at an appropriate angle, which can be about 45°. In some examples, the inner wall of the separation chamber 120 can be relatively warmer than an interior portion of the separation chamber 120. In some examples, directing the process fluid along the inner wall of the separation chamber 120 in a generally rotational manner can help to keep the process fluid in a gaseous state after the process fluid is depressurized in the separation chamber 120. In such examples, the relatively warmer inner wall can help to counteract the Joule-Thompson cooling effect that can occur when the process fluid decompresses.

In some examples, the extraction apparatus 100 can be configured to receive the process fluid from a process fluid storage container 105, which can be a cylinder or any other storage device capable of holding the process fluid.

An initial state of the process fluid in the process fluid storage container 105 can be solid, liquid, gaseous, or supercritical. Where the process fluid is in an initial liquid state, a siphon can be optionally used to remove the process fluid from a top opening of the process fluid storage container while maintaining consistent pressure. Alternatively, the liquid process fluid can be removed by inverting the process fluid storage container 105 such that the opening is on the bottom.

In some examples, the extraction apparatus 110 can include a heating source 107 configured to heat the process fluid prior to ingress of the process fluid into the extraction vessel 110. In some examples, heating source 107 can heat the process fluid within the process fluid storage container 105. The heating source 107 can be a heating blanket, electric band heater, induction heater, coiled tubing with heating fluid in intimate contact, or an open flame.

In some examples, as the process fluid is heated by the heating source 107, a temperature and the internal pressure of the process fluid rises. In this way, a desired pressure for the process fluid in the system can be achieved without the need for a pump. If necessary, the heating source 107 can deliver continuous or recurring heat to the process fluid so as to maintain the pressure within the system.

Optionally, the temperature and internal pressure of the process fluid can be increased to the point of allowing a phase transformation of the process fluid. Optionally, this phase transformation can occur within the process fluid storage container 105. When the initial state of the process fluid is liquid or gas, increasing the temperature and pressure above the fluid's critical point can allow a phase change to a supercritical state. For example, heating carbon dioxide above about 87° F. at a pressure above about 1083 psi will result in a phase change to a supercritical state.

The extraction apparatus 100 can include a temperature regulator. The temperature regulator can include a temperature regulation fluid and a temperature regulation fluid circulation line 142. In the example shown in FIG. 1, the temperature regulator can include a chiller/heater 144 with temperature regulation fluid circulation line 142 running through the extraction apparatus 100 to regulate temperature of the process fluid.

The temperature regulator can be configured to permit re-circulation of the temperature regulation fluid. The temperature regulation fluid circulation line 142 can run in close proximity to the process fluid circulation conduit 142. In some examples, the circulation line can form a coil around the temperature regulation fluid circulation line 142.

In some examples, the temperature regulation fluid can be liquid water, steam or another heating/cooling fluid. In some examples, the temperature regulation fluid can include distilled water. In some examples, the temperature regulation fluid can be a mixture, for example, a mixture of about 50% water and about 50% glycol.

The temperature regulator can be configured to raise, lower, or maintain the temperature of the process fluid prior to introduction into the extraction vessel 110 to achieve a desired temperature. In some examples, the temperature regulator can be configured to optionally cause a phase change in the process fluid prior to entering the extraction vessel 110.

In some examples, temperature regulator can include a heat exchanger 146 configured to regulate temperature of the process fluid prior to ingress of the process fluid into the extraction vessel 110. In some examples, the heat exchanger 146 can be a tube-in-tube configuration, allowing the process fluid to be in close physical proximity to the temperature regulation fluid, thereby allowing for the exchange of heat between the two fluids while maintaining their separation from one another. Alternative configurations of the heat exchanger 146 could include a shell & tube design, a coil design, or any other method of heat exchange.

In some examples, the temperature regulator can be configured to regulate the temperature of the process fluid within the extraction vessel 110. In some examples, temperature regulator can be configured to regulate the temperature of the process fluid within the separation chamber 120. As shown in the example of FIG. 1, the extraction apparatus 100 can include an extraction vessel temperature regulator 116 and a separation chamber temperature regulator 126. As shown in this example, the temperature regulation fluid circulation line 142 can extend to the extraction vessel temperature regulator 116 and the separation chamber temperature regulator 126. In the example shown in FIG. 1, the system can be configured to permit the temperature regulation fluid to flow through the temperature regulation fluid circulation line 142, through the extraction vessel temperature regulator 116, through the temperature regulation fluid circulation line 142, through the separation chamber temperature regulator 126, and through the temperature regulation fluid circulation line 142. In some examples, the extraction vessel temperature regulator 116 can be a heating/cooling jacket surrounding an exterior portion of extraction vessel 110. In some examples, the separation chamber temperature regulator 126 can be a heating/cooling jacket surrounding an exterior portion of separation chamber 120.

In some examples, the temperature regulator can regulate the temperature of the process fluid in other portions of the process fluid circulation conduit 130. In one example, a portion of the process fluid circulation conduit 130 connecting the extraction vessel 110 with the separation chamber 120 could run in close proximity to the temperature regulation fluid circulation line 142. Alternative configurations could include a shell & tube design, a coil design, or any other method of heat exchange. Any other portion of the process fluid circulation conduit 130 could be regulated in the same ways.

In some examples, the extraction apparatus 100 can include a back pressure regulator 135 configured to maintain pressure within the separation chamber 120 and vent the process fluid. In some examples, the backpressure regulator 135 can be located at a discharge opening of the separation chamber 120.

In some examples, a collection cup 122 can be used to capture the extracted material after separation from the process fluid in the separation chamber 120.

In other examples, a valve, such as the sixth valve 132.6 shown in FIG. 1, can be used to direct the extracted material out of the separation chamber 120 after separation from the process fluid. Optionally, the extracted material can be directed out of the separation chamber 120 while the separation chamber 120 remains under pressure.

As shown in FIG. 1, the extraction apparatus 100 can include one or more pressure gauges 171. As shown in FIG. 1, the extraction apparatus 100 can include one or more relief valves 133. As shown in FIG. 1, the extraction apparatus 100 can include one or more relief valves 133.

Figure 2:
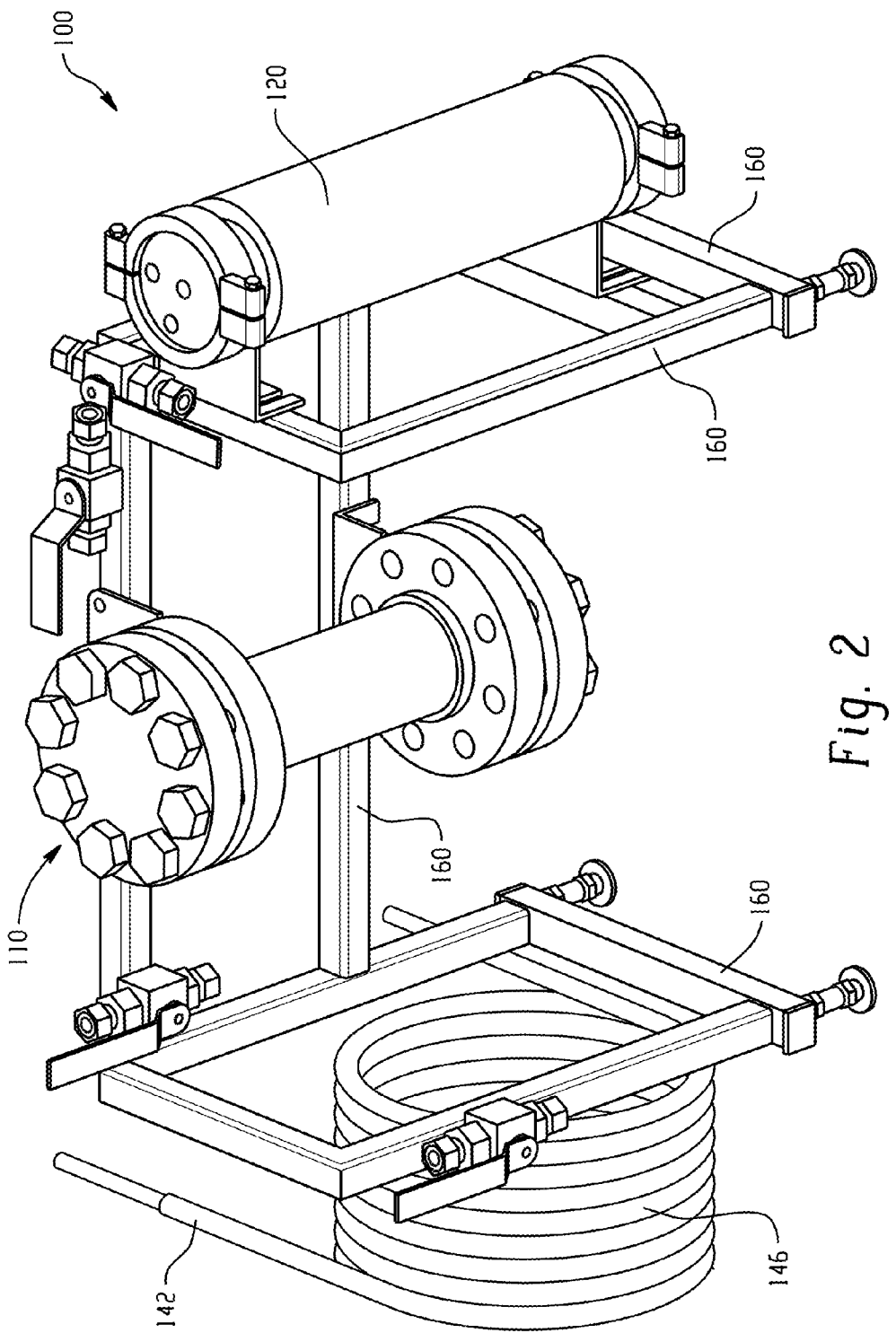
FIG. 2 is a perspective view of an extraction system.

In the example shown in FIG. 2, some of the described aspects of the extraction apparatus 100 are shown mounted on a frame 160 in an exemplary arrangement.

Figure 3:
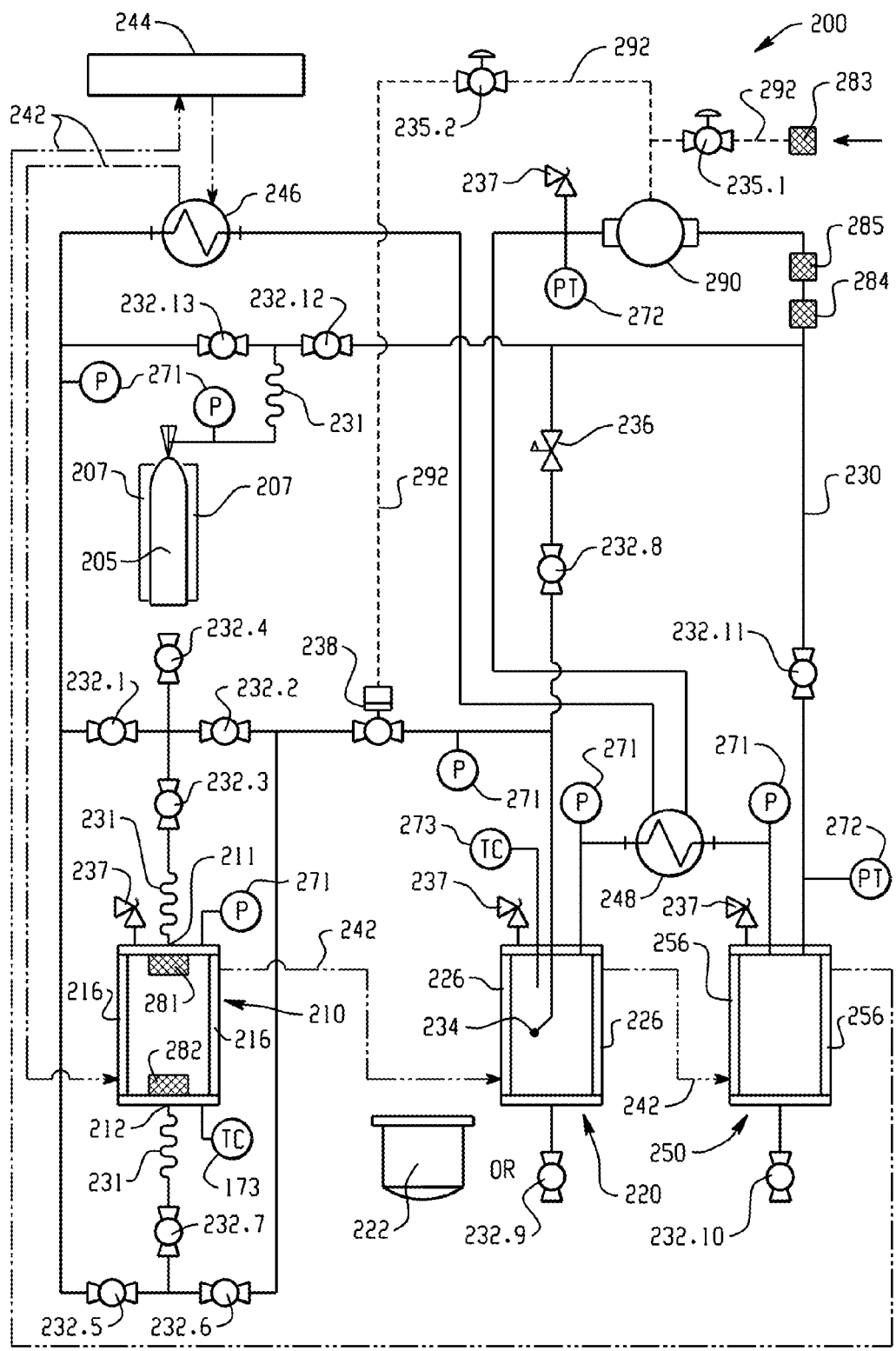
FIG. 3 is a schematic diagram of an extraction system.

As shown in FIG. 3, a re-circulating extraction apparatus 200 can include an extraction vessel 210 configured to receive a process fluid, permit the process fluid to come into contact with a source material within the extraction vessel 210, permit an extracted material to be removed from the source material, and permit the extracted material and the process fluid to form a mixture.

In some examples, the extraction vessel 210 can have an opening for receiving the process fluid. In some examples, the extraction vessel can have multiple openings for receiving the process fluid. In the example shown in FIG. 3, the extraction vessel 210 includes a first extraction vessel opening 211 and a second extraction vessel opening 212. In some examples, the openings of the extraction vessel can be sealed using an appropriate O-ring, such as an elastomeric O-ring. One example of a suitable elastomeric O-ring can be a Buna-90 O-ring.

The extraction vessel 210 can include an extraction vessel filter adapted to retain portions of the source material while also allowing the mixture to pass. In some examples, the extraction vessel 210 can have a multiple filters. As shown in FIG. 3, the extraction vessel 210 can include a first extraction vessel filter 281 located near the first extraction vessel opening 211 and a second extraction vessel filter 282 located near the second extraction vessel opening 212.

Figures 4A, 4B, 4C:
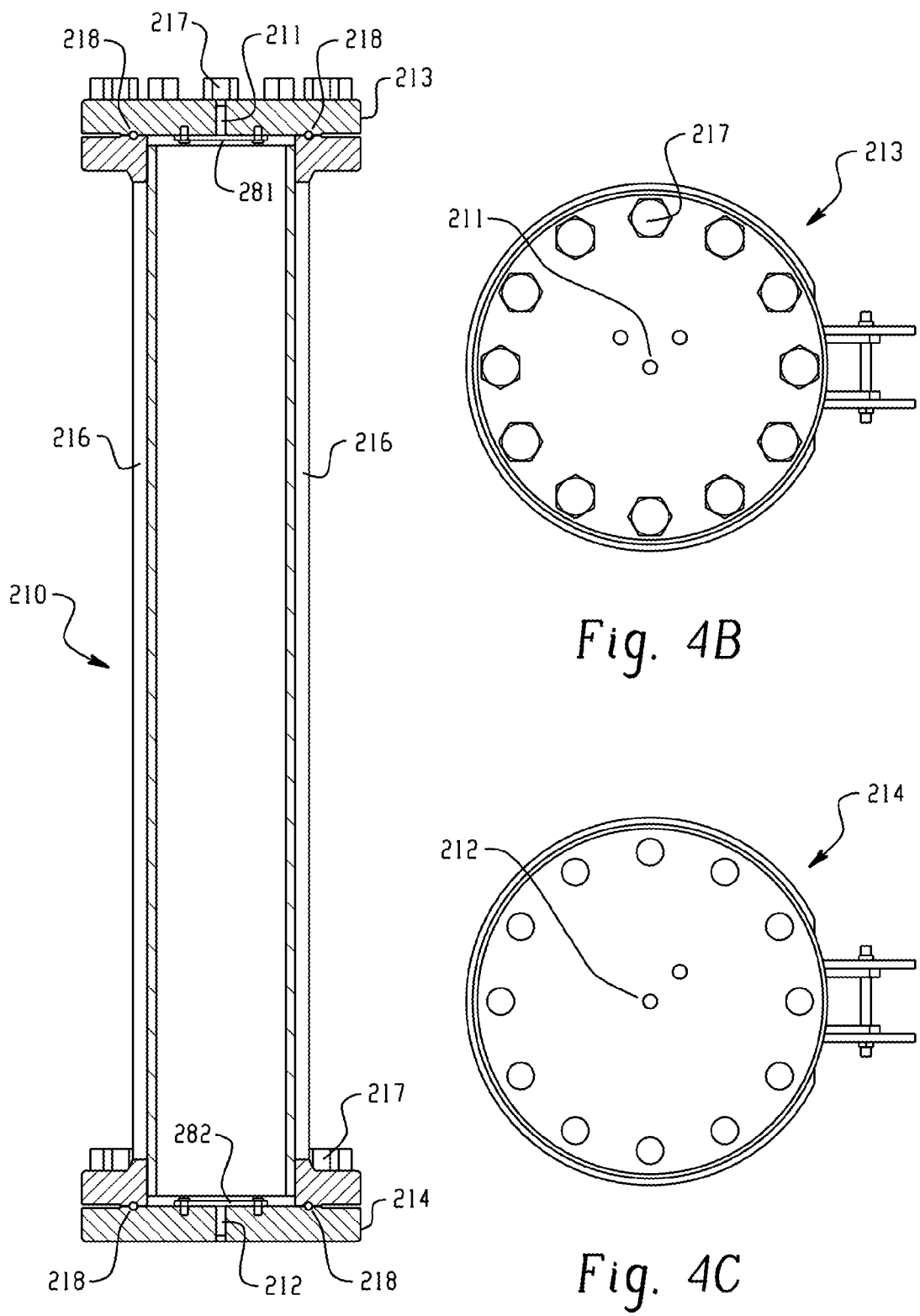
FIG. 4(A) is a cross-section of an extraction vessel.
FIG. 4(B) is a top view of an extraction vessel.
FIG. 4(C) is a bottom view of an extraction vessel.

In the example shown in FIGS. 4A, 4B, and 4C, the extraction vessel 210 can include an interior portion sounded by an extraction vessel temperature regulator 216, with a first flange 213 and a second flange 214. As also shown in FIG. 4A, O-rings 218 can be used to seal the first and second flanges 213 and 214 of the extraction vessel 210. As also shown in FIG. 4A, the first and second extraction vessel filters 281 and 282 can be located near the first and second extraction vessel openings 211 and 212 respectively.

Figures 5A, 5B, 5C:
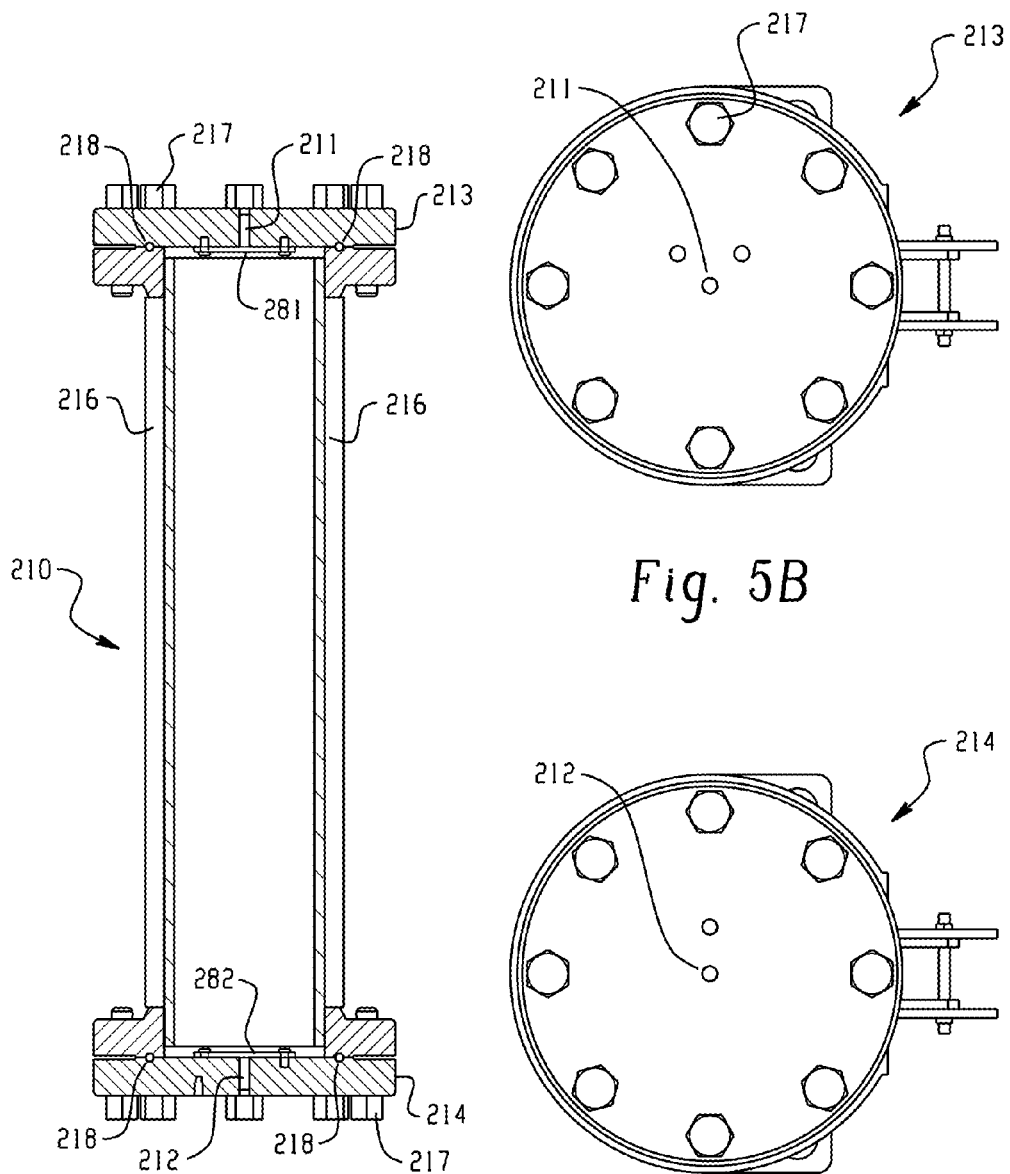
FIG. 5(A) is a cross-section of an extraction vessel.
FIG. 5(B) is a top view of an extraction vessel.
FIG. 5(C) is a bottom view of a extraction vessel.

As shown in FIG. 4B, the first flange 213 can have one or more openings, which may include the first extraction vessel opening 211. As shown in FIG. 4C, the second flange 214 can have one or more openings, which may include the second extraction vessel opening 212. In some examples, the top and bottom flanges can be secured with bolts 217. In some examples, the extraction vessel can be about 20 liters and can be rated to a maximum pressure of about 1500 psi at about 200° F. In other examples, the extraction vessel 210 can be about 5 liters and can be rated to a maximum pressure of about 1500 psi at about 200° F. FIGS. 5A, 5B, and 5C show another example configuration of extraction vessel 210, top flange 213, and bottom flange 214.

Figure 6A:
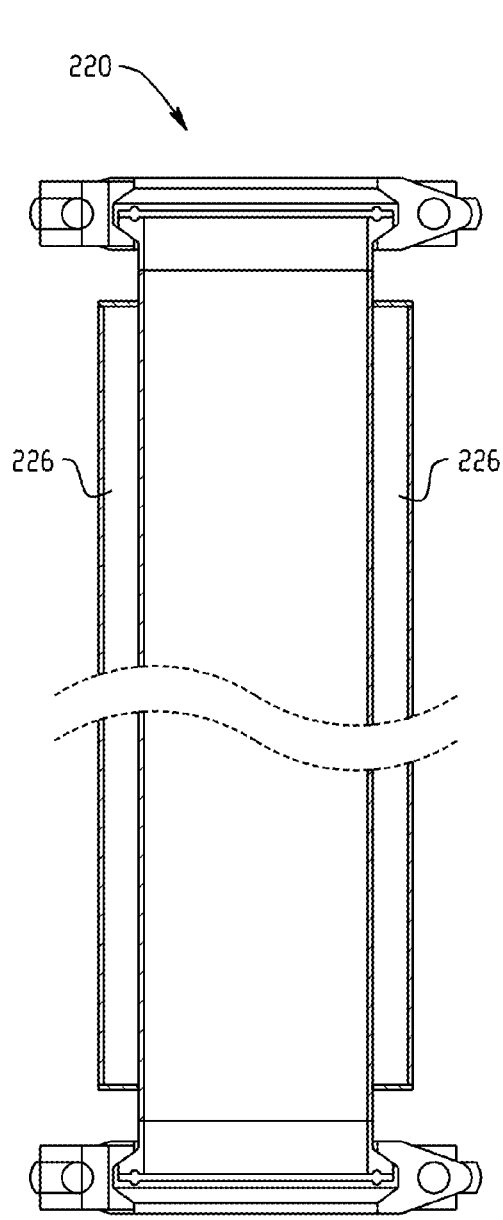
FIG. 6(A) is a cross-section of a separation chamber.
Figure 6B:
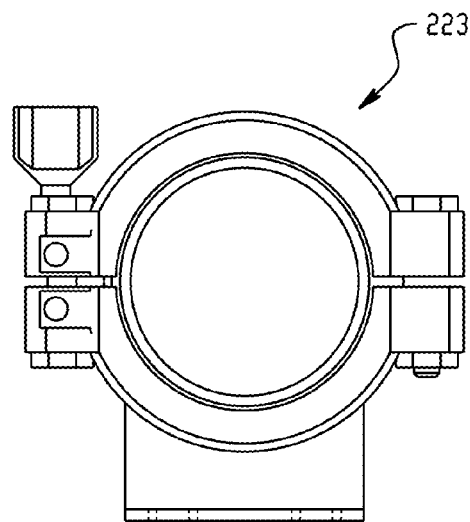
FIG. 6(B) is a top view of a separation chamber.
Figure 6C:
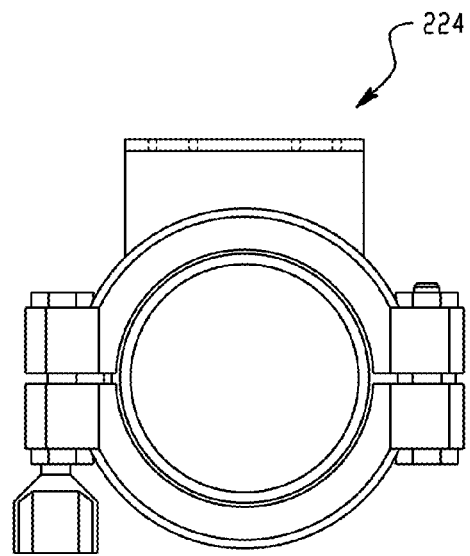
FIG. 6(C) is a bottom view of a separation chamber.

The re-circulating extraction apparatus 200 can include a separation chamber 220. As shown in FIG. 6A, the separation chamber 220 can have an interior portion, surrounded by a separation chamber temperature regulator 226. As shown in FIGS. 6B and 6C, the separation chamber 220 can have a first cap 223 and a second cap 224. In some examples, the separation chamber 220 can be rated for about 500 psi at about 200° F.

Figure 7A:
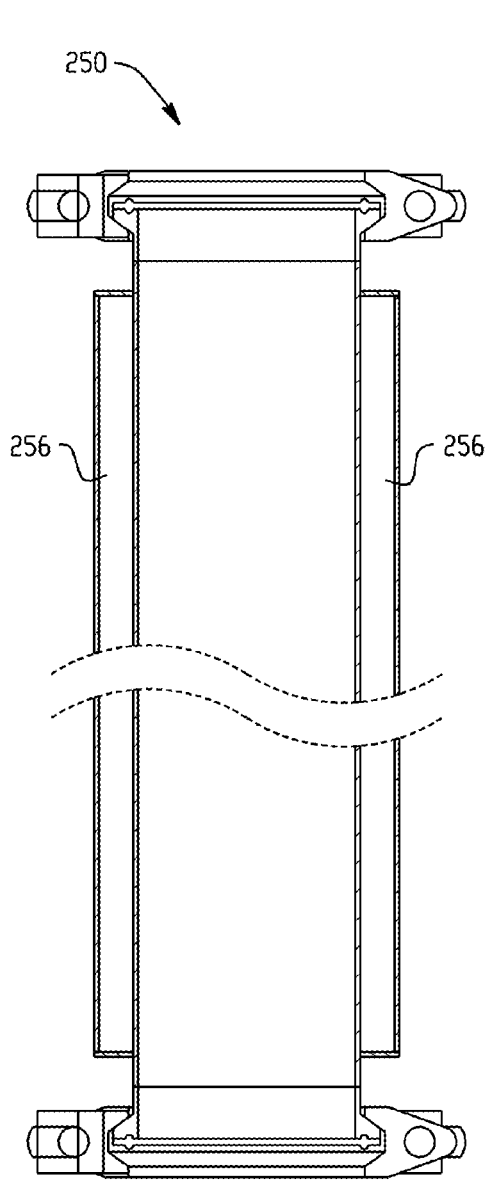
FIG. 7(A) is a cross-section of an overflow chamber.
Figure 7B:
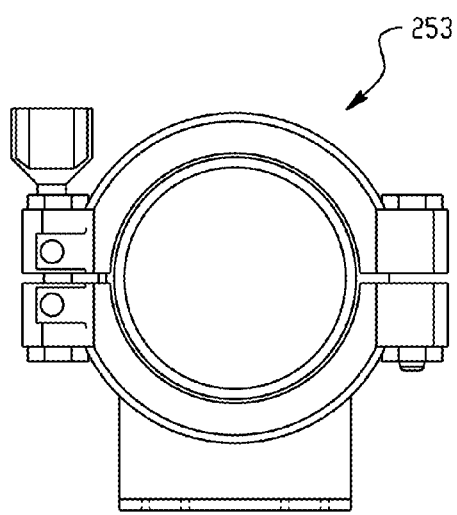
FIG. 7(B) is a top view of an overflow chamber.
Figure 7C:
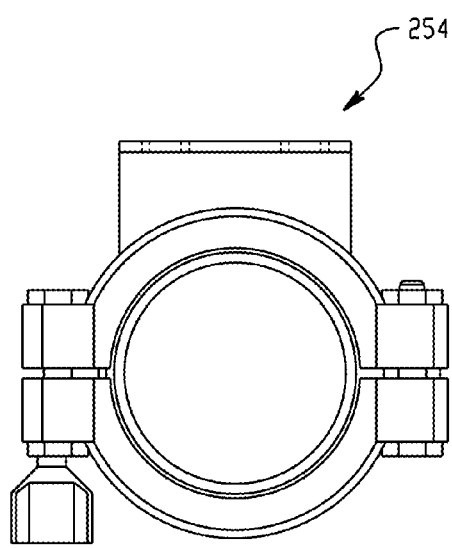
FIG. 7(C) is a bottom view of an overflow chamber.

The re-circulating extraction apparatus 200 can include an overflow chamber 250. As shown in FIG. 7A, the overflow chamber 250 can have an interior portion, surrounded by an overflow temperature regulator 256. As shown in FIGS. 7B and 7C, the overflow chamber 250 can have a first cap 253 and a second cap 254. In some examples, the overflow chamber 250 can be rated for about 500 psi at 200° F.

The re-circulating extraction apparatus 200 can include a process fluid circulation conduit 230 configured to selectively restrict, allow, and reversibly direct flow of the process fluid into and out of the extraction vessel 210. The process fluid circulation conduit 230 can also be configured to permit the mixture to flow from the extraction vessel 210 to the separation chamber 220. The process fluid circulation conduit 230 can also be configured to permit the process fluid to be re-circulated through the extraction vessel 210, separation chamber 220, and overflow chamber 250.

The process fluid circulation conduit 230 can be stainless steel in some examples. In other examples, the process fluid circulation conduit 230 can be made from one of a family of austenitic nickel-chromium based alloys, such as those supplied commercially under the brand name Inconel® by Special Metals Corporation. In other examples, the process fluid circulation conduit 230 can be made from and other suitable material for high corrosion resistance. In other examples, the process fluid circulation conduit 230 can be steel or another suitable material for applications with low sanitary requirements. In some examples, the process fluid circulation conduit 230 can be sized about 304 stainless steel (SS) with about ⅜ inches diameter, and a wall thickness of about 0.035 inches. The process fluid circulation conduit 230 can include flexible portions 231.

In some examples, a pump 290 can be configured to create a desired pressure and to help circulate the process fluid through the system and to recover the process fluid for re-circulation. Any type of pump suitable for use with the chosen process fluid 210 could be used, including pumps of varying configurations and which can use particular liquids or gases and be air driven or electrically driven. In some examples, the pump 290 can be an air driven gas booster. In some examples, the pump 290 may operate with a pump fluid, which may be air or any other suitable fluid.

In some examples, the pump 290 may circulate the pump fluid through a pump fluid circulation line 292. As shown in the example of FIG. 3, the pump fluid circulation line 292 can be configured with one or more valves, such as solenoid valves 235.1, 235.2, 235.3, and safety valve 238. As also shown in FIG. 3, the pump fluid circulation line 292 can be configured with one or more filters, such as pump fluid intake filter 283.

The process fluid circulation conduit 230 can include one or more valves configured to selectively restrict, allow, and reverse a direction of flow of the process fluid through the process fluid circulation conduit 230 and other portions of the re-circulating extraction apparatus 200. In one example arrangement shown in FIG. 3, the system of valves can include thirteen valves, labeled 232.1, 232.2, 232.3, 232.4, 232.5, 232.6, 232.7, 232.8, 232.9, 232.10, 232.11, 232.12, 232.13, configured to selectively restrict, allow, and reverse a direction of flow of the process fluid through the process fluid circulation conduit 230 and other portions of the re-circulating extraction apparatus 200. In some examples, the valves can be rated from about −22° F. to about 356° F.

In some examples, the process fluid circulation conduit 230 can be configured with a system of valves to selectively direct the process fluid to flow within the extraction vessel 210 for a desired time, for example, to allow the extraction process to be completed to a desired extent. In some examples, the re-circulating extraction apparatus 200 can be configured with a system of valves to permit reversal of a direction of flow of the process fluid through the extraction vessel 210. In some examples, the reversal of the direction of flow of the process fluid through the extraction vessel 210 can facilitate cleaning or clearing of first and second extraction vessel filters 281 and 282 without interrupting ongoing extraction processing. In some examples, the system of valves can include one or more pairs of opposing valves for directing the flow of process fluid.

In the example apparatus depicted in FIG. 3, the process fluid can be directed in a first direction of flow such that the process fluid enters the extraction vessel 210 through extraction vessel opening 211, passing through extraction vessel filter 212. According to this direct direction of flow, the process fluid can pass through an interior portion of the extraction vessel 210 where it can come into contact with the source material, extract the extracted material, and form the mixture. The mixture can then be directed to exit the extraction vessel 210 at opening 213 and passing through filter 214. Optionally, the valves can be re-configured such that the direction of flow of the process fluid and/or mixture to be reversed, causing the process fluid and/or mixture to enter the extraction vessel 210 at extraction vessel opening 213, pass through extraction vessel filter 214, exit opening 211 and pass through filter 212.

As shown in FIG. 3, the re-circulating extraction apparatus 200 can include one or more relief valves 237 to selectively allow the depressurization of fluid at one or more locations within the re-circulating extraction apparatus 200. As shown in FIG. 3, the re-circulating extraction apparatus 200 can include one or more regulating valves 236. As shown in FIG. 3, the re-circulating extraction apparatus 200 can include one or more solenoid valves 235.

The process fluid circulation conduit 230 can include a separation portion 234 configured to receive the mixture and permit a portion of the extracted material to separate from the mixture within the separation chamber 220. In some examples, the separation portion 234 can allow the process fluid to decompress in the separation chamber 220 and separate the extracted material from the process fluid without the use of a valve or regulator for separation.

In some examples, the separation portion 234 can include an orifice. The orifice can be sized to match a flow rate of the process fluid. In some examples, the orifice can be about 0.010 inches in diameter. In some examples, the orifice can restrict the flow of process fluid, allowing a significant pressure drop in the mixture after passing through the orifice and allowing the process fluid to change from a subcritical or supercritical state to a gaseous state, thereby allowing the extracted material to fall out, or separate, from the process fluid.

In some examples, the separation portion 234 can be positioned near an inner wall of the separation chamber 220. In some examples, the separation portion 234 can be orientated to direct the process fluid along the inner wall of the separation chamber 220 in a generally rotational manner. In some examples, a portion of process fluid circulation conduit 230 leading to the separation portion 234 can be angled at an appropriate angle, which can be about 45°. In some examples, the inner wall of the separation chamber 220 can be relatively warmer than an interior portion of the separation chamber 220. In some examples, directing the process fluid along the inner wall of the separation chamber 220 in a generally rotational manner can help to keep the process fluid in a gaseous state after the process fluid is depressurized in the separation chamber 220. In such examples, the relatively warmer inner wall can help to counteract the Joule-Thompson cooling effect that can occur when the process fluid decompresses.

In some examples, the re-circulating extraction apparatus 200 can be configured to receive the process fluid from a process fluid storage container 205, which can be a cylinder or any other storage device capable of holding the process fluid.

In some examples, the extraction apparatus 210 can include a heating source 207 configured to heat the process fluid prior to ingress of the process fluid into the extraction vessel 210. In some examples, heating source 207 can heat the process fluid within a process fluid storage container 205. The heating source can be a heating blanket, electric band heater, induction heater, coiled tubing with heating fluid in intimate contact, or an open flame.

In some examples, as the process fluid can be heated by the heating source 207, a temperature and the internal pressure of the process fluid rises. If necessary, the heating source 207 can deliver continuous or recurring heat to the process fluid so as to help maintain the pressure within the system.

Optionally, the temperature and internal pressure of the process fluid can be increased to the point of causing a phase transformation of the process fluid. Optionally, this phase transformation can occur within the process fluid storage container 205. When the initial state of the process fluid is liquid or gas, increasing the temperature and pressure above the fluid's critical point will cause a phase change to a supercritical state. For example, heating carbon dioxide above about 87° F. at a pressure above about 1083 PSI can result in a phase change to a supercritical state.

The initial state of the process fluid in the process fluid storage container 205 can be solid, liquid, gaseous, or supercritical. Where the process fluid is in an initial liquid state, a siphon can be optionally used to remove the process fluid from a top opening of the process fluid storage container while maintaining consistent pressure. Alternatively, the liquid process fluid can be removed by inverting the process fluid storage container 205 such that the opening is on the bottom.

The re-circulating extraction apparatus 200 can include a temperature regulator. The temperature regulator can include a temperature regulation fluid and a temperature regulation fluid circulation line 242. In the example shown in FIG. 3, the temperature regulator can include a chiller/heater 244 with temperature regulation fluid circulation line 242 running through the re-circulating extraction apparatus 200 to regulate temperature of the process fluid in various locations of the re-circulating extraction apparatus 200.

The temperature regulator can be configured to permit re-circulation of the temperature regulation fluid. In some examples, the temperature regulation fluid can be liquid water, steam or another other heating/cooling fluids. The temperature regulation fluid circulation line 242 can run in close proximity to the process fluid circulation conduit 242. In some examples, the circulation line can form a coil around the temperature regulation fluid circulation line 242.

The temperature regulator can be configured to raise, lower, or maintain the temperature of the process fluid prior to introduction into the extraction vessel 210 to achieve a desired temperature. In some examples, the temperature regulator can be configured to optionally cause a phase change in the process fluid prior to entering the extraction vessel 210.

As shown in the example of FIG. 3, the temperature regulator can include a heat exchanger 246 configured to regulate temperature of the process fluid prior to ingress of the process fluid into the extraction vessel 210. In some examples, the heat exchanger 246 can be a tube-in-tube configuration, allowing the process fluid to be in close physical proximity to the temperature regulation fluid, thereby allowing for the exchange of heat between the two fluids while maintaining their separation from one another. Alternative configurations of the heat exchanger 246 could include a shell & tube design, a coil design, or any other method of heat exchange.

In some examples, a regenerative heat exchanger can be configured to help regulate the temperature of process fluid at the beginning and the end of the closed-loop re-circulating system. In some examples, the regenerative heat exchanger can use heat generated from the compression of process fluid by the pump at the beginning of the cycle to offset Joule-Thompson cooling that can occur when the process fluid decompresses in the separation chamber.

In the example shown in FIG. 3, a regenerative heat exchanger 248 comprises two portions of the process fluid circulation conduit 230 running in close proximity to one another to transfer heat from a relatively warm portion of the process fluid circulation conduit 230 to a relatively cool portion of the process fluid circulation conduit 230. In some examples, the regenerative heat exchanger 248 can be a tube-in-tube configuration, allowing a relatively warm portion of the process fluid to be in close physical proximity to a relatively cool portion of the process fluid, thereby allowing for the exchange of heat between the two portions while maintaining their separation from one another. Alternative configurations of the heat exchanger 248 could include a shell & tube design, a coil design, or any other method of heat exchange.

In some examples, the temperature regulator can be configured to regulate the temperature of the process fluid within the extraction vessel 210. In some examples, temperature regulator can be configured to regulate the temperature of the process fluid within the separation chamber 220. As shown in the example of FIG. 3, the re-circulating extraction apparatus 200 can include an extraction vessel temperature regulator 216, a separation chamber temperature regulator 226, and an overflow chamber temperature regulator 256. As shown in this example, the temperature regulation fluid circulation line 242 can extend to the extraction vessel temperature regulator 216, the separation chamber temperature regulator 226, and the overflow chamber temperature regulator 256 and allow the temperature regulation fluid to flow through each of these components. In some examples, the temperature regulators 216, 226, and 256 can be a heating/cooling jacket. Alternative configurations could include a shell & tube design, a coil design, or any other method of heat exchange.

In some examples, the temperature regulator can regulate the temperature of the process fluid in other portions of the process fluid circulation conduit 230. In one example, a portion of the process fluid circulation conduit 230 connecting the extraction vessel 210 with the separation chamber 220 could run in close proximity to the temperature regulation fluid circulation line 242. Alternative configurations could include a shell & tube design, a coil design, or any other method of heat exchange. Any other portion of the process fluid circulation conduit 230 could be regulated in the same ways.

In some examples, a collection cup 222 can be used to capture the extracted material after separation from the process fluid in the separation chamber 220.

In other examples, a valve, such valve 232.9 shown in FIG. 3, can be used to direct the extracted material out of the separation chamber 220 after separation from the process fluid while the separation chamber 220 remains under pressure.

As shown in FIG. 3, the re-circulating extraction apparatus 200 can include one or more pressure gauges 271 to indicate a pressure of fluid at one or more locations within the re-circulating extraction apparatus 200. As shown in FIG. 3, the re-circulating extraction apparatus 200 can include one or pressure transducers 272 to sense a pressure of fluid at one or more locations within the re-circulating extraction apparatus 200. As shown in FIG. 3, the re-circulating extraction apparatus 200 can include one or more thermocouples 273 to sense a temperature of fluid at one or more locations within the re-circulating extraction apparatus 200.

Figure 8:
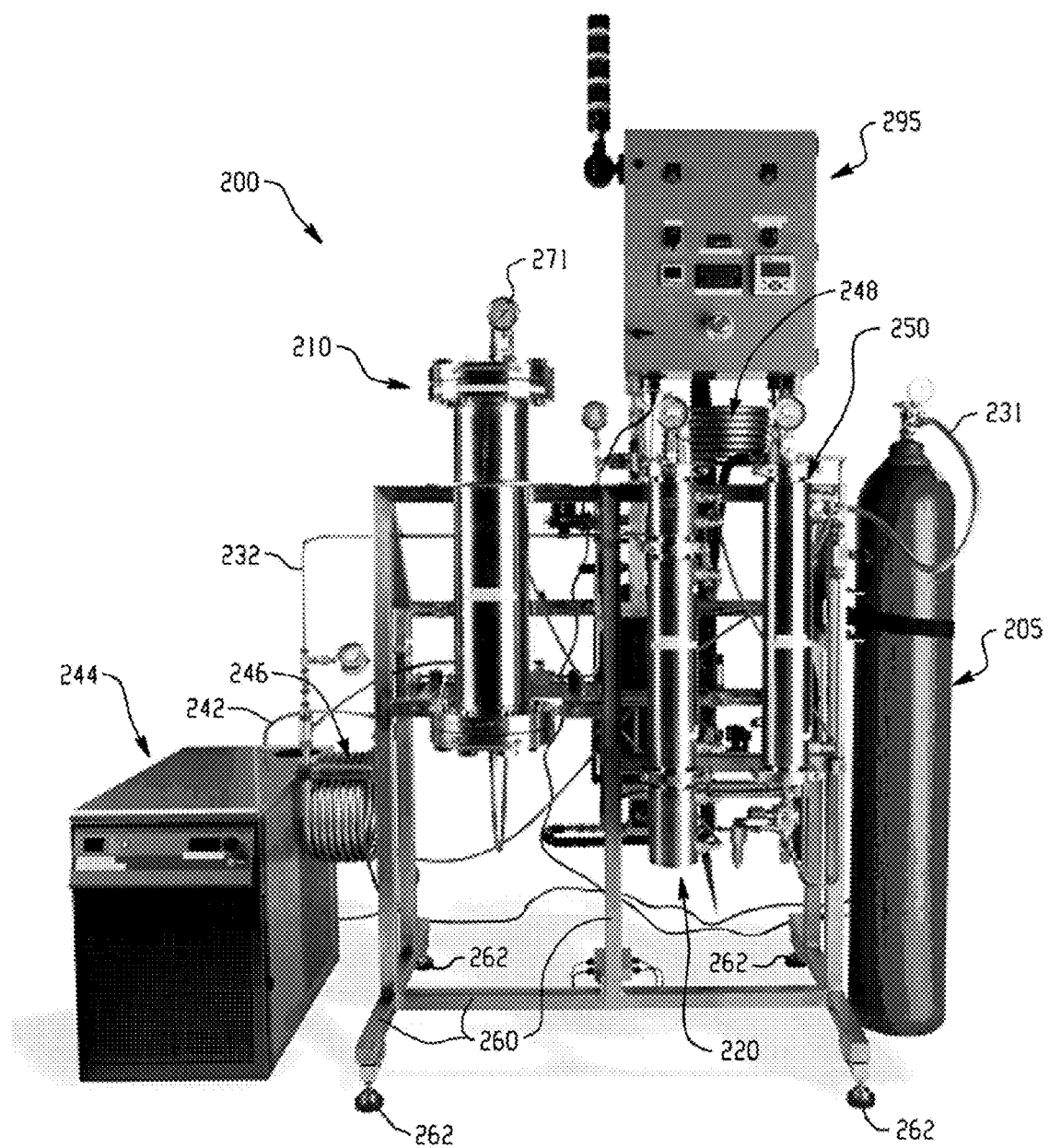
FIG. 8 is a perspective view of an extraction system.

In the example shown in FIG. 8, some of the described aspects of the re-circulating extraction apparatus 200 are shown mounted on a frame 260 in an exemplary arrangement. In some examples, a system scale 262 can be incorporated into the apparatus 200 below the frame 260.

In some examples, the extraction apparatus 100 and re-circulating extraction apparatus 200 can display system paramaters such as temperature, pressure, and time. In some examples, the extraction apparatus 100 and re-circulating extraction apparatus 200 can receive data on system parameters from one more sensors. For example, in the apparatus shown in FIG. 1, pressure can be displayed on pressure gauges 171. Optionally, pressure and other system parameters can be displayed on an electronic control panel or other suitable display mechanism. In the example shown in FIG. 3, a control panel could display pressure data received from sensor such as pressure gauges 271 and pressure transducers 272. The control panel could also display temperature data received from sensor such as thermocouples 173.

In some examples, various aspects of the operation of the extraction apparatus 100 and re-circulating extraction apparatus 200 can be automated with a control system. The control system can include electronic components and mechanical components. In some examples, the control system can be configured to automate the operation of the system based upon data supplied by sensors or based upon the lapse of time. For example, in the device shown in FIG. 3, the control system could be configured to turn on or off the chiller/heater 244 or the pump 290, in response to data supplied by the sensors or the lapse of time. The system could also be configured to implement certain other logical operations helpful in system operation. For example, the control system can be configured to run certain operations for a certain elapsed period of time or based upon certain data received from sensors and thereafter perform a desired function or set of functions, such as open or close certain valves. In the example of FIG. 3, the control system could be configured to open or close any of valves 232.1 through 232.13, any of the relief valves 233, any of the solenoid valves 135, any of the regulating valves 136, and any of the safety valves 138.

In the example shown in FIG. 8, the apparatus 200 can have a control box 295 that can include either or both of the control panel and control system. The control box could be electrically connected to the varius sensors and system components of the apparatus 200.

Examples, of methods of operating the system disclosed in FIG. 3 will now be disclosed. As an initial state, the system can be confirmed to be clean.

The extraction vessel 210 can be opened with the following steps. Close valves 232.1 and 232.2. Open valves 232.3 and 232.4. Remove bolts on the top of the extraction vessel 210, for example using a 1.5" impact socket and impact wrench. Lift the flange and allow it to rest in the open position on the stops.

The extraction vessel 210 can be loaded with source material, optionally with a funnel to avoid spillage. The source material can be prepared in a desired fashion. For example, the source material could be ground, gently compressed, or otherwise prepared. The system scale 262 can be used to weigh the amount of source material loaded.

Once the desired amount of source material is loaded, the extraction vessel can be closed and sealed. In some examples, the sealing surfaces can be checked to be clean and generally free of debris. In some examples, O-rings can be inspected for any visible damage or defects and replaced as necessary. In some examples, the O-rings do not require lubrication. In some examples, an extraction vessel flanges 213 and 214 can be closed and closure bolts 217 installed.

The re-circulating extraction apparatus 200 can be evaluated of moister or other fluids. The following valves can be opened: 232.1, 232.2, 232.3, 232.5, 232.10, 232.11, 232.12, and 232.13. A pump can be connected to valve 232.10 and the system pumped down to a desired pressure, for example 20-25 in·Hg. This pressure can be held for several minutes to ensure no gross leaks and to remove moisture. All valves can be closed and the pump disconnected from valve 232.10.

Process fluid can be filled according to the following steps. Tare the scale by pushing a "tare/reset" key. Open a valve on the process fluid storage container 205. Open valves 232.1, 232.3, 232.5, and 232.7. Pressurize and fill extraction vessel 210 by slowly opening valve 232.13. Extraction vessel 210 can be pressurized from both top and bottom. Allow extraction vessel 210 pressure to equalize with the pressure in the process fluid storage container 205. Shut valves 232.5 and 232.13. Pressurize the separation chamber 220 and overflow chamber 250 to 300 psi by opening valve 232.12 and throttling valve 232.11. Close valve 232.11 when pressure in the separation chamber 220 and overflow chamber 250 is approximately 300 psi. Increase extraction vessel 210 pressure by turning the switch to "START" on control panel. Once extraction vessel 210 pressure has reached desired pressure, open valve 232.6. Shut valve 232.12. Open valve 232.11. Allow system to stabilize for approximately 5 minutes.

At this stage in the example method, the system can be now circulating process fluid 210 and extracting. It may be necessary to adjust the amount of process fluid 210 in the system to maintain a desired extraction pressure. To increase pressure in the extraction vessel 201, the following steps can be performed. Shut valve 232.11. Open valve 232.12 until extraction vessel 210 reaches the desired pressure or the separation chamber 220 or overflow chamber 250 reach 450 psi. Shut valve 232.12. Open valve 232.11. Allow the system to stabilize, and repeat as necessary. To decrease pressure in the extraction vessel 210, the following steps can be performed. Shut one of valves 232.1 and 232.5 (only one of them will be open). Throttle valve 232.13 and allow the extraction vessel pressure to decrease to a desired level. Shut valve 232.13. Open one of valves 232.1 or 232.5 (whichever was previously opened).

In the example shown in FIG. 3, the process fluid 210 can flow through the process fluid circulation conduit 230 according to the following path: (1) out of the left side of the pump 290, (2) down to the regenerative heat exchanger 248, (3) up and over to the heat exchanger 246, (4) through the extraction chamber 210, (5) through the safety valve 238, (6) through the separation portion 234 within in the separator chamber 220, (7) to the regenerative heat exchanger 248, (8) through the overflow chamber 250, (9) through filters 284 and 285, and (10) back up to the pump 290.

In the example shown in FIG. 3, the temperature regulation fluid can flow through the temperature regulation fluid circulation line according to the following path: (1) out of the chiller/heater 244, (2) through the temperature heat exchanger 246, (3) through the extraction vessel temperature regulator 216, (4) through the separation chamber temperature regulator 226, (5) through the overflow chamber temperature regulator 226, and (6) back up to the chiller/heater 244.

In some examples, a control system can be equipped with a timer that will automatically shut down the system after a set amount of time has elapsed. The timer can be adjusted at any time during the extraction. Actual time elapsed can be displayed.

In some examples, a flow of the process fluid within in the extraction vessel 210 can be reversed during operation. For example, to back flush a clogged filter, to prevent channeling through the source material, or both. In some examples, one or more of the extraction vessel filters 281 or 282 can be back-flushed when a differential pressure greater than 300 psi exists between the extraction vessel 210 pressure and either the pressure at either of the extraction vessel openings 211 or 212.

According to some examples, a first direction of flow through the extraction vessel 210 can be reversed according to the following steps. Open valve 232.5. Open valve 232.2. Shut valve 232.1. Shut valve 232.6.

According to some examples, following a first reversal of direction of the process fluid, a second direction of flow through the extraction vessel 210 can be reversed according to the following steps. Open valve 232.1. Open valve 232.6. Shut valve 232.5. Shut valve 232.2.

According to some examples, the separation portion 234 may include an orifice and an orifice filter. The orifice and orifice filter can be unclogged according to the following steps. Shut valve 232.2 and valve 232.6 (only one of them will be open). Allow the pump 290 to draw the process fluid out of the separation chamber 220 and overflow chamber 250 and transfer the process fluid to the extraction vessel 210. Optionally, a portion of the process fluid can be transferred back to the process fluid storage container 205 by shutting valves 232.1 and 232.5, throttling valve 232.14 to direct pump output to the process fluid storage container, then shutting valve 232.13 and re-opening valve 1 or 5.

Continuing with the example method for unclogging an orifice and orifice filter, when the separation chamber 220 and overflow chamber 250 reach approximately 70 psi, the pump can be configured to automatically turn off. Shut valve 232.11. Open valve 232.10 to relieve any residual pressure in the separation chamber 220 and overflow chamber 250. Remove the separation chamber top flange 213. Remove the orifice and orifice filter. Clean the orifice and the orifice filter by soaking them in acetone or methanol and blowing them out with compressed air. Verify the orifice is clear by looking through it.

Continuing with the example method for unclogging the orifice and orifice filter, after cleaning the orifice and orifice filter, reassemble the orifice and filter using the provided Teflon tape. Use caution to prevent excess Teflon tape from getting into the orifice. Tighten the orifice assembly such that the orifice points toward the separation vessel inner wall. Replace the separation vessel top flange 213 and tighten the clamp bolts 217 to about 20 ft-lbs. Close valve 232.10. Open valve 232.12. Pressurize separation vessel 220 and overflow chamber 250 to about 300 psi by opening valve 12 and throttling valve 232.11. Close valve 232.11 when separator pressure is approximately 300 psi. In some examples, the pump can be configured to automatically re-start when separator vessel pressure is above about 70 psi. Open valve 232.2 or valve 232.6 (whichever valve was previously opened) to restart the extraction. Shut valve 12. Open valve 232.11. Increase or decrease extractor vessel pressure as described above.

Once the extraction is complete to a desired extent, the process fluid can be recovered according to the following method. Increase the temperature of the chiller/heater 244 to at least about 110° F. Open valve 232.6 and shut valve 232.2 (they may already be in this position). Shut valve 1 and valve 5 (only one of them will be open). Open valve 232.13 slowly to allow flow into the process fluid storage container 205. When separation vessel 220 pressure is less than about 200 psi, shut valve 232.6 and open valves 232.2 and 232.8. In some examples, the pump 290 can be configured to shut down automatically when separation chamber pressure reaches about 70 psi. Close process fluid storage container valve. Vent remaining process fluid out of the system by opening valves 232.10, 232.1 and 232.4 and allow residual pressure in the system to vent. The system can now be powered down, or new source material can be loaded and the extraction process started again.

In some examples, the orifice can be sized such that a flow rate of the process fluid into the separation chamber 220 matches a flow rate of the process fluid from the pump 290. In examples, in which the process fluid is supercritical carbon dioxide, the following system parameters and orifice sizes can be used. Chiller/heater temperature: about 110° F. to about 120° F. Extraction vessel pressure: about 1200 psi to about 1400 psi. Orifice size: Size #15 orifice for about 30 cubic feet per minute (CFM) air flow (about 7.5 horse power (HP) air compressor); Size #15 orifice for about 60 CFM air flow (about 15 HP air compressor); Size #25 orifice for about 100 CFM air flow (about 25 HP air compressor). Weight of CO2 in system: approximately 12 pounds for about 5 L extraction vessel systems and about 30 pounds for about 20 L extraction vessel systems. Separation chamber and overflow chamber pressure: about 350 psi to about 400 psi. Separation chamber and overflow chamber temperature: about 70° F. to about 80° F.

In examples, in which the process fluid is subcritical carbon dioxide, the following system parameters and orifice sizes can be used. Chiller/heater temperature: about 60° F. to about 70° F. Extraction pressure: about 1100 psi to about 1400 psi. Orifice size: size #10 orifice for about 30 CFM air flow (about 7.5 HP air compressor); size #15 orifice for about 60 CFM air flow (about 15 HP air compressor); size #20 orifice for about 100 CFM air flow (about 25 HP air compressor). Weight of CO2 in system: approximately 17 pounds for the about 5 L extraction vessel systems and about 45 pounds for the about 20 L extraction vessel systems. Separation chamber and overflow chamber pressure: about 250 psi to about 300 psi. Separation chamber and overflow chamber temperature: about 20° F. to about 30° F.

In Subcritical CO2 operation, the extraction vessel 210 can be full of liquid CO2. In such examples, CO2 can be added to the system after extraction has begun in order to maintain a desired extraction pressure.

Numerical ranges and parameters set forth approximations of the broad scope of the disclosed systems and methods. The numerical values set forth in the specific examples, are reported as precisely as possible. Any numerical value, however, inherently contains certain errors necessarily resulting from the standard deviation found in their respective testing measurements.

Furthermore, while the devices, systems, methods, and so on have been illustrated by describing examples, and while the examples, have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples, shown and described. Accordingly, departures can be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Directional terms such as "up", "down", "left", "right", and "over" are meant to reference the representations shown in figures and are not meant to restrict the particular arrangement of the various elements in the claimed apparatus or method.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicant intends to indicate "only A or B, but not both," then the term "only A or B but not both" will be employed. Similarly, when the applicant intends to indicate "one and only one" of A, B, or C, the applicant will employ the phrase "one and only one." Thus, use of the term "or" herein is the inclusive, and not the exclusive use.

What is claimed is:

1. An extraction apparatus, comprising:
   an extraction vessel configured to receive a process fluid, permit the process fluid to come into contact with a source material within the extraction vessel, permit an extracted material to be removed from the source material, and permit the extracted material and the process fluid to form a mixture, the extraction vessel including an extraction vessel filter adapted to retain portions of the source material while also allowing the mixture to pass;
   a separation chamber;
   a process fluid circulation conduit configured to selectively restrict, allow, and reversibly direct flow of the process fluid into and out of the extraction vessel and selectively allow and reversibly direct flow of the mixture into and out of the extraction vessel while permitting continuous flow of the mixture from the extraction vessel to the separation chamber, the process fluid circulation conduit including a separation portion configured to receive the mixture and permit a portion of the extracted material to separate from the mixture; and
   a temperature regulator including a temperature regulation fluid and a temperature regulation fluid circulation line, the temperature regulator configured to regulate the temperature of the process fluid.

2. The apparatus of claim 1, further comprising a heating source configured to heat the process fluid prior to ingress of the process fluid into the extraction vessel.

3. The apparatus of claim 1, further comprising a heat exchanger configured to regulate temperature of the process fluid prior to ingress of the process fluid into the extraction vessel.

4. The apparatus of claim 1, wherein the temperature regulator comprises an extraction vessel temperature regulator and a separation chamber temperature regulator.

5. The apparatus of claim 1, wherein the process fluid includes carbon dioxide.

6. The apparatus of claim 5, wherein the process fluid includes supercritical carbon dioxide.

7. The apparatus of claim 1, wherein the source material includes a botanical substance.

8. The apparatus of claim 1, wherein the extracted material includes at least one of a botanical oil and a wax.

9. The apparatus of claim 1, wherein the process fluid circulation conduit includes valves configured to selectively restrict, allow, and reversibly direct flow of the process fluid through the process fluid circulation conduit.

10. The apparatus of claim 9, wherein the extraction vessel includes a first extraction vessel filter and a second extraction vessel filter.

11. The apparatus of claim 10, wherein the apparatus is configured to permit reversal of a direction of flow of the process fluid through the first extraction vessel filter and the second extraction vessel filter.

12. The apparatus of claim 1, wherein the separation portion includes an orifice.

13. The apparatus of claim 12, wherein the separation portion is orientated to direct the process fluid along an inner wall of the separation chamber in a generally rotational manner.

14. The apparatus of claim 13, wherein the orifice is sized to match a flow rate of the process fluid.

15. The apparatus of claim 14, wherein the separation portion is further configured to permit a portion of the extracted material to decompress and separate from the mixture within the separation chamber without the use of a valve or regulator for achieving separation.

16. The apparatus of claim 1, wherein the separation portion is further configured to permit a portion of the extracted material to decompress and separate from the mixture within the separation chamber without the use of a valve or regulator for achieving separation.

17. The apparatus of claim 1, further including
   a back pressure regulator configured to maintain pressure within the separation chamber and vent the process fluid.

18. A re-circulating extraction apparatus, comprising:
   an extraction vessel configured to receive a process fluid, permit the process fluid to come into contact with a source material within the extraction vessel, permit an extracted material to be removed from the source material, and permit the extracted material and the process fluid to form a mixture, the extraction vessel including an extraction vessel filter adapted to retain portions of the source material while also allowing the mixture to pass;
   a separation chamber;
   an overflow chamber;
   a process fluid circulation conduit configured to selectively restrict, allow, and reversibly direct flow of the process fluid into and out of the extraction vessel, and selectively allow and reversibly direct flow of the mixture into and out of the extraction vessel while permitting continuous flow of the mixture from the extraction vessel to the separation chamber, permit the process fluid to flow from the separation vessel to the overflow chamber, and permit recirculation of the process fluid, the process fluid circulation conduit including a separation portion configured to receive the mixture and permit a portion of the extracted material to separate from the mixture; and a temperature regulator including a temperature regulation fluid and a temperature regulation fluid circulation line, the temperature regulator configured to regulate the temperature of the process fluid.

19. The apparatus of claim 18, further comprising a heating source configured to heat the process fluid prior to ingress of the process fluid into the extraction vessel.

20. The apparatus of claim 18, further comprising a heat exchanger configured to regulate temperature of the process fluid prior to ingress of the process fluid into the extraction vessel.

21. The apparatus of claim 18, further comprising a regenerative heat exchanger.

22. The apparatus of claim 18, wherein the temperature regulator comprises an extraction vessel temperature regulator, a separation chamber temperature regulator and an overflow chamber temperature regulator.

23. The apparatus of claim 18, wherein the process fluid includes carbon dioxide.

24. The apparatus of claim 23, wherein the process fluid includes supercritical carbon dioxide.

25. The apparatus of claim 18, wherein the source material includes a botanical substance.

26. The apparatus of claim 18, wherein the extracted material includes at least one of a botanical oil and a wax.

27. The apparatus of claim 18, wherein the process fluid circulation conduit includes valves configured to selectively restrict, allow, and reversibly direct flow of the process fluid through the process fluid circulation conduit.

28. The apparatus of claim 27, wherein the extraction vessel includes a first extraction vessel filter and a second extraction vessel filter.

29. The apparatus of claim 28, wherein the apparatus is configured to permit reversal of a direction of flow of the process fluid through the first extraction vessel filter and the second extraction vessel filter.

30. The apparatus of claim 18, wherein the separation portion includes an orifice.

31. The apparatus of claim 30, wherein the separation portion is orientated to direct the process fluid along an inner wall of the separation chamber in a generally rotational manner.

32. The apparatus of claim 31, wherein the orifice is sized to match a flow rate of the process fluid.

33. The apparatus of claim 32, wherein the separation portion is further configured to permit a portion of the extracted material to decompress and separate from the mixture within the separation chamber without the use of a valve or regulator for achieving separation.

34. The apparatus of claim 18, wherein the separation portion is further configured to permit a portion of the extracted material to decompress and separate from the mixture within the separation chamber without the use of a valve or regulator for achieving separation.

35. The apparatus of claim 18, further including
a back pressure regulator configured to maintain pressure within the separation chamber and vent the process fluid.

36. An extraction apparatus, comprising:
an extraction vessel configured to receive a process fluid, permit the process fluid to come into contact with a source material within the extraction vessel, permit an extracted material to be removed from the source material, and permit the extracted material and the process fluid to form a mixture, the extraction vessel including an extraction vessel filter adapted to retain portions of the source material while also allowing the mixture to pass;

a separation chamber;

a process fluid circulation conduit configured to permit flow of the process fluid into and out of the extraction vessel and permit flow of the mixture from the extraction vessel to the separation chamber, the process fluid circulation conduit including a separation portion configured to receive the mixture and permit a portion of the extracted material to decompress and separate from the mixture within the separation chamber without the use of a valve or regulator for achieving separation; and a temperature regulator including a temperature regulation fluid and a temperature regulation fluid circulation line, the temperature regulator configured to regulate the temperature of the process fluid.

37. The apparatus of claim 36, wherein the separation portion includes an orifice.

38. The apparatus of claim 37, wherein the separation portion is orientated to direct the process fluid along an inner wall of the separation chamber in a generally rotational manner.

39. The apparatus of claim 38, wherein the orifice is sized to match a flow rate of the process fluid.

40. The apparatus of claim 36, further including
a back pressure regulator configured to maintain pressure within the separation chamber and vent the process fluid.

41. A recirculating extraction apparatus, comprising:
an extraction vessel configured to receive a process fluid, permit the process fluid to come into contact with a source material within the extraction vessel, permit an extracted material to be removed from the source material, and permit the extracted material and the process fluid to form a mixture, the extraction vessel including an extraction vessel filter adapted to retain portions of the source material while also allowing the mixture to pass;

a separation chamber;
an overflow chamber;
a process fluid circulation conduit configured to permit flow of the process fluid into and out of the extraction vessel and permit flow of the mixture from the extraction vessel to the separation chamber, permit the process fluid to flow from the separation vessel to the overflow chamber, and permit circulation of the process fluid, the process fluid circulation conduit including a separation portion configured to receive the mixture and permit a portion of the extracted material to separate from the mixture within the separation chamber without the use of a valve or regulator for achieving separation; and a temperature regulator including a temperature regulation fluid and a temperature regulation fluid circulation line, the temperature regulator configured to regulate the temperature of the process fluid.

42. The apparatus of claim 41, wherein the separation portion includes an orifice.

43. The apparatus of claim 42, wherein the separation portion is orientated to direct the process fluid along an inner wall of the separation chamber in a generally rotational manner.

44. The apparatus of claim 43, wherein the orifice is sized to match a flow rate of the process fluid.

45. The apparatus of claim 41, further including
a back pressure regulator configured to maintain pressure within the separation chamber and vent the process fluid.

* * * * *